US009925969B2

(12) United States Patent
Gaughan et al.

(10) Patent No.: US 9,925,969 B2
(45) Date of Patent: Mar. 27, 2018

(54) CUT-OFF VALVE AND HOT WHEEL PROTECTION VALVE ARRANGEMENT

(71) Applicant: Westinghouse Air Brake Technologies Corporation, Wilmerding, PA (US)

(72) Inventors: Edward W. Gaughan, Greensburg, PA (US); William John Potter, Trafford, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 116 days.

(21) Appl. No.: 15/062,721

(22) Filed: Mar. 7, 2016

(65) Prior Publication Data

US 2017/0253226 A1  Sep. 7, 2017

(51) Int. Cl.
- *B60T 15/36* (2006.01)
- *B60T 15/02* (2006.01)
- *B61H 13/34* (2006.01)

(52) U.S. Cl.
CPC ............ *B60T 15/36* (2013.01); *B60T 15/021* (2013.01); *B61H 13/34* (2013.01)

(58) Field of Classification Search
CPC ....... B60T 15/36; B60T 15/021; B61H 13/34; G05D 16/163
See application file for complete search history.

(56) References Cited

U.S. PATENT DOCUMENTS

| | | | |
|---|---|---|---|
| 2,707,134 A * | 4/1955 | Cook | ................... B60T 15/304 303/35 |
| 2,992,861 A | 7/1961 | Hursen | |
| 3,001,832 A | 9/1961 | McClure et al. | |
| 3,228,729 A * | 1/1966 | Schubert | ............... B60T 13/268 303/89 |
| 3,279,867 A | 10/1966 | Bueler | |
| 3,443,839 A | 5/1969 | Hinrichs et al. | |
| 3,731,983 A | 5/1973 | Washbourn | |
| 3,832,015 A | 8/1974 | Beck et al. | |
| 3,994,536 A | 11/1976 | Prada | |
| 4,025,126 A | 5/1977 | Wilson | |
| 4,063,784 A | 12/1977 | Pick | |
| 4,105,257 A | 8/1978 | Engle et al. | |

(Continued)

FOREIGN PATENT DOCUMENTS

EP  2952405 A1  9/2015

*Primary Examiner* — Vishal R Sahni
(74) *Attorney, Agent, or Firm* — The Webb Law Firm

(57) ABSTRACT

A hot wheel protection valve arrangement including a hot wheel protection valve, the hot wheel protection valve including a body defining a passageway, a piston slidably positioned within the passageway, a bushing positioned on the piston and within the passageway, a first diaphragm provided on a first end of the piston, the first diaphragm defining a first chamber in the passageway, a second diaphragm provided on a second end of the piston, the second diaphragm defining a second chamber in the passageway, a third chamber being defined between the first diaphragm and the second diaphragm, and an exhaust port defined in the body and in fluid communication with the third chamber, a brake cylinder line that establishes fluid communication between a brake cylinder, the first chamber, and the third chamber; and an emergency reservoir line that establishes fluid communication between an emergency reservoir and the second chamber.

20 Claims, 9 Drawing Sheets

(56) References Cited

U.S. PATENT DOCUMENTS

| | | | |
|---|---|---|---|
| 4,125,294 | A | 11/1978 | Cannon |
| 4,161,340 | A | 7/1979 | Hart |
| 4,230,377 | A | 10/1980 | Goebels |
| 4,339,155 | A | 7/1982 | Hart |
| RE31,386 | E | 9/1983 | McEathron |
| 4,405,182 | A | 9/1983 | Hart |
| 4,407,548 | A | 10/1983 | Graham |
| 4,453,779 | A | 6/1984 | Bridigum |
| 4,474,412 | A | 10/1984 | Schmitt |
| 4,478,460 | A | 10/1984 | Wickham |
| 4,558,907 | A | 12/1985 | Reiss et al. |
| 4,589,704 | A * | 5/1986 | Graham ............... B60T 13/261 188/265 |
| 4,678,241 | A | 7/1987 | Tamamori et al. |
| 4,775,194 | A | 10/1988 | Vaughn et al. |
| RE32,885 | E | 3/1989 | Graham |
| 4,875,739 | A | 10/1989 | Hart et al. |
| 5,044,698 | A | 9/1991 | Hart et al. |
| 5,083,843 | A * | 1/1992 | Engle ..................... B60T 15/54 303/36 |
| 5,213,397 | A | 5/1993 | Troiani |
| 5,326,159 | A | 7/1994 | Hart et al. |
| 5,332,297 | A * | 7/1994 | Cunkelman ........... B60T 13/665 303/15 |
| 5,378,055 | A | 1/1995 | Maas et al. |
| 5,387,030 | A | 2/1995 | Gayfer et al. |
| 5,429,426 | A | 7/1995 | Hart |
| 5,429,427 | A | 7/1995 | Gayfer |
| 5,564,794 | A | 10/1996 | Hart |
| 5,722,736 | A | 3/1998 | Cook |
| 5,785,392 | A | 7/1998 | Hart |
| 5,788,338 | A | 8/1998 | Hart et al. |
| 6,116,280 | A | 9/2000 | Goodell |
| 6,126,245 | A | 10/2000 | Barber et al. |
| 6,609,767 | B2 | 8/2003 | Mortenson et al. |
| 6,609,769 | B2 * | 8/2003 | Hart ..................... B60T 17/04 303/36 |
| 6,769,744 | B2 | 8/2004 | Marsh et al. |
| 6,971,723 | B2 | 12/2005 | Engle et al. |
| 7,077,481 | B2 | 7/2006 | Marsh et al. |
| 7,306,294 | B2 | 12/2007 | Hart et al. |
| 7,556,322 | B2 | 7/2009 | Veltri et al. |
| 9,108,603 | B2 | 8/2015 | Call et al. |
| 9,333,959 | B2 | 5/2016 | Gaughan et al. |
| 2003/0193237 | A1 | 10/2003 | Hart et al. |
| 2004/0130205 | A1 | 7/2004 | Wood et al. |
| 2004/0130207 | A1 | 7/2004 | Corley, Jr. |
| 2009/0229932 | A1 | 9/2009 | Reynolds et al. |
| 2011/0108374 | A1 | 5/2011 | Call et al. |
| 2011/0297252 | A1* | 12/2011 | Hurley ................. G05D 16/163 137/488 |
| 2014/0102558 | A1 | 4/2014 | Call et al. |
| 2014/0125115 | A1* | 5/2014 | Gaughan ............... B60T 13/266 303/33 |
| 2015/0061360 | A1 | 3/2015 | Vaughn |
| 2015/0224973 | A1* | 8/2015 | Amann ................. B60T 15/20 303/40 |
| 2016/0046273 | A1* | 2/2016 | Wright ................. B60T 15/021 303/69 |

* cited by examiner

CUT-OFF VALVE AND HOT WHEEL PROTECTION VALVE ARRANGEMENT

BACKGROUND OF THE INVENTION

Field of the Invention

The present disclosure is directed to brake valve arrangements for railway cars and, more particularly, to a cut-off valve and hot wheel protection valve arrangement for a brake valve arrangement for a railway car.

Description of Related Art

Current brake systems for railway vehicles experience leakage of pressurized fluid into the brake cylinder of the brake system. The Association of American Railroads' specification for a single railway car specifies allowable leakage into/out of the brake cylinder at the rate of +/−1 psi/min. At this rate, acceptable loss of brake cylinder pressure is permitted while still safely maintaining brake cylinder pressure levels for the operation of the railway vehicle's brake system. When operating a railway vehicle on a grade for an extended period of time, however, a minimal level of leakage into the brake cylinder in one minute can increase to a high enough pressure to cause excessive heat to be generated by the excessive pressure. This excessive pressure results in higher than desired shoe force creating a "hot wheel" condition in which forces within the brake cylinder cause the brake cylinder and the wheels of the railway vehicle to experience excessive heat. By venting pressure from the brake cylinder, this "hot wheel" condition is avoided.

An example of a preexisting brake cylinder pressure reducing valve is disclosed in U.S. Pat. No. 5,083,843. The brake cylinder pressure reducing valve is used to control the release of brake cylinder pressure. Upon the graduated release of brake cylinder pressure, brake pipe pressure is restored by a locomotive brake valve. The control valve of the release valve is moved to its full release position and brake cylinder pressure is rapidly reduced. The reduction in brake cylinder pressure reduces a downward force exerted on a diaphragm by the brake cylinder pressure in a first chamber, allowing the graduating volume air pressure to move a stem upward. Thus, the first chamber is sealed and air is retained in the brake cylinder at a value equal to the remaining reduction in brake pipe pressure. Therefore, with the graduating check valve seated, further exhaust of brake cylinder pressure is prevented and the valve remains at a stable position. Brake cylinder pressure can be reduced in a predetermined proportion to a brake pipe pressure increase. Therefore, this release valve is not configured to release brake cylinder pressure upon the brake cylinder exceeding a predetermined amount. The brake cylinder is released as a function of an increase in brake pipe pressure, not through an increase in the brake cylinder pressure.

Another example of a preexisting brake cylinder pressure reducing valve is disclosed in U.S. Pat. No. 6,609,769. A pneumatically graduated brake pressure release valve for a freight train brake system is used to release pressure from a brake cylinder. The graduated release valve controls the exhaust of the brake cylinder pressure. A metering valve portion of the graduated release valve exhausts brake cylinder pressure generally proportional to an increase in brake pipe pressure. On one side, a graduating piston is held in position by pressure from an emergency reservoir. On an opposite side, pressure from the brake pipe and a brake cylinder exhaust urge against the piston. Once the brakes have been applied, if a reduction in brake cylinder pressure is desired, the brake pipe pressure must be increased. This increase in brake pipe pressure unbalances the pressures acting on the piston and causes the brake cylinder to be exhausted to atmosphere. The brake cylinder will only exhaust, however, until the brake cylinder pressure decreases proportionally to the brake pipe pressure increase. The pressure exhausted from the brake cylinder is generally a function of the increase in brake pipe pressure. This graduated release valve is not configured to reduce brake cylinder pressure upon an increase in brake cylinder pressure due to leakage of pressurized fluid into the brake cylinder.

SUMMARY OF THE INVENTION

Preexisting graduated brake cylinder release valves, some of which have been discussed hereinabove, are not configured to exhaust brake cylinder pressure upon leakage of pressurized fluid into the brake cylinder. Many of the preexisting graduated brake cylinder release valves release brake cylinder pressure in proportion to an increase in brake pipe pressure. Further, none of the preexisting brake cylinder release valves use a cut-off valve to isolate an exhausted pressurized fluid from the graduated brake cylinder release valves when a brake cylinder pressure exceeds a pre-determined pressure.

In one aspect of the disclosure, a hot wheel protection valve arrangement may include a hot wheel protection valve, the hot wheel protection valve may include a body defining a passageway, a piston slidably positioned within the passageway, a bushing positioned on the piston and within the passageway, a first diaphragm provided on a first end of the piston, the first diaphragm may define a first chamber in the passageway, a second diaphragm may be provided on a second end of the piston, the second diaphragm may define a second chamber in the passageway, a third chamber may be defined between the first diaphragm and the second diaphragm, and an exhaust port may be defined in the body and in fluid communication with the third chamber, a brake cylinder line may establish fluid communication between a brake cylinder, the first chamber, and the third chamber; and an emergency reservoir line may establish fluid communication between an emergency reservoir and the second chamber. Pressurized fluid may be vented from the brake cylinder via the exhaust port upon a brake cylinder pressure exceeding a predetermined force exerted by an emergency reservoir pressure.

The bushing may define at least one bushing passageway in fluid communication with the brake cylinder line and the exhaust port. A choke may be provided in the brake cylinder line between the brake cylinder and an inlet port defined in the hot wheel protection valve configured to receive pressurized fluid from the brake cylinder. A fourth chamber may be defined between the first diaphragm and the second diaphragm. A brake pipe line may establish fluid communication between a brake pipe and the fourth chamber, or an auxiliary reservoir line establishes fluid communication between an auxiliary reservoir and the fourth chamber. The pressurized fluid may be vented from the brake cylinder via the exhaust port upon a brake cylinder pressure exceeding a predetermined force exerted against a differential of the emergence reservoir pressure and a brake pipe pressure or an auxiliary reservoir pressure. A biasing member may be provided in the fourth chamber. The biasing member may create a biasing force against the second diaphragm. A groove may be defined on an outer surface of the piston. As the piston slides within the passageway to a predetermined position, pressurized fluid from the brake cylinder line may be permitted to flow through the bushing, around the groove defined on the piston, through the bushing again, and through the exhaust port. An outer circumferential surface of the first diaphragm may be held within the body of the hot wheel protection valve and an inner circumferential surface of the first diaphragm may be held on the first end of the piston between a feedback follower and a spacer. An outer circumferential surface of the second diaphragm may be held within the body of the hot wheel protection valve and an inner circumferential surface of the second diaphragm may be held on the second end of the piston between the second end of the piston and a follower.

In another aspect of the disclosure, a hot wheel protection valve arrangement may include a cut-off valve in fluid communication with an exhaust port of a hot wheel protection valve and a brake cylinder line, the cut-off valve may include a piston positioned within a passageway, a bushing provided around the piston and within the passageway, and a biasing member provided on an end of the piston. The brake cylinder line may establish fluid communication between the cut-off valve and a brake cylinder. The cut-off valve may prevent pressurized fluid from being exhausted from the brake cylinder upon a brake cylinder pressure exceeding a predetermined force exerted by the cut-off valve. The biasing member may create the predetermined force against the piston to keep the cut-off valve in an open position.

The passageway of the cut-off valve may be in fluid communication with the exhaust port of the hot wheel protection valve, the brake cylinder line, and a line to atmosphere. A groove may be defined on an outer surface of the piston. As the piston slides within the passageway to a predetermined position, pressurized fluid from the exhaust port of the hot wheel protection valve may be permitted to flow through the bushing, around the groove defined on the piston, through the bushing again, and through an exhaust port on the cut-off valve. A plurality of grooves may be defined on an outer surface of the piston. An O-ring may be provided in each groove of the plurality of grooves.

In another aspect of the disclosure, a hot wheel protection valve arrangement may include a hot wheel protection valve, the hot wheel protection valve may include a body defining a passageway, a piston slidably positioned within the passageway, a bushing positioned on the piston and within the passageway, a first diaphragm provided on a first end of the piston, the first diaphragm defining a first chamber in the passageway, a second diaphragm provided on a second end of the piston, the second diaphragm may define a second chamber in the passageway, a third chamber may be defined between the first diaphragm and the second diaphragm, and an exhaust port defined in the body and in fluid communication with the third chamber, a cut-off valve in fluid communication with the exhaust port of the hot wheel protection valve, the cut-off valve may include a piston positioned within a passageway, a bushing provided around the piston and within the passageway, and a biasing member provided on an end of the piston, a brake cylinder line that establishes fluid communication with the first chamber, the third chamber, and the passageway of the cut-off valve, and an emergency reservoir line that establishes fluid communication between an emergency reservoir and the second chamber. Pressurized fluid may be vented from the brake cylinder via the exhaust port upon a brake cylinder pressure exceeding a force exerted by an emergency reservoir pressure.

The cut-off valve may prevent pressurized fluid from being exhausted from the brake cylinder upon a brake cylinder pressure exceeding a predetermined force exerted by the cut-off valve. The biasing member may create the predetermined force against the piston of the cut-off valve to keep the cut-off valve in an open position. The bushing of the hot wheel protection valve may define at least one bushing passageway in fluid communication with the exhaust port of the hot wheel protection valve, the passageway of the cut-off valve, and an exhaust port defined by the cut-off valve. A choke may be provided in the brake cylinder line between the brake cylinder and an inlet port defined in the hot wheel protection valve configured to receive pressurized fluid from the brake cylinder. A fourth chamber may be defined between the first diaphragm of the hot wheel protection valve and the second diaphragm of the hot wheel protection valve. A brake pipe line may establish fluid communication between a brake pipe and the fourth chamber, or an auxiliary reservoir line establishes fluid communication between an auxiliary reservoir and the fourth chamber. The pressurized fluid may be vented from the brake cylinder via the exhaust port upon a brake cylinder pressure exceeding a predetermined force exerted against a differential of the emergence reservoir pressure and a brake pipe pressure or an auxiliary reservoir pressure. A biasing member may be provided in the fourth chamber. The biasing member may create a biasing force against the second diaphragm. A groove may be defined on an outer surface of the piston of the hot wheel protection valve. As the piston slides within the passageway to a predetermined position, pressurized fluid from the brake cylinder may be permitted to flow through the bushing of the hot wheel protection valve, around the groove defined on the piston of the hot wheel protection valve, through the bushing of the hot wheel protection valve again, and through the exhaust port of the hot wheel protection valve. An outer circumferential surface of the first diaphragm may be held within the body of the hot wheel protection valve and an inner circumferential surface of the first diaphragm may be held on the first end of the piston of the hot wheel protection valve between a feedback follower and a spacer. An outer circumferential surface of the second diaphragm may be held within the body of the hot wheel protection valve and an inner circumferential surface of the second diaphragm may be held on the second end of the piston of the hot wheel protection valve between the second end of the piston and a follower.

These and other features and characteristics of the cut-off valve hot wheel protection valve arrangement, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the disclosure. As used in the specification and claims, the singular form of "a", "an", and "the" include plural referents unless the context clearly dictates otherwise.

DESCRIPTION OF THE DISCLOSURE

Figure 1:
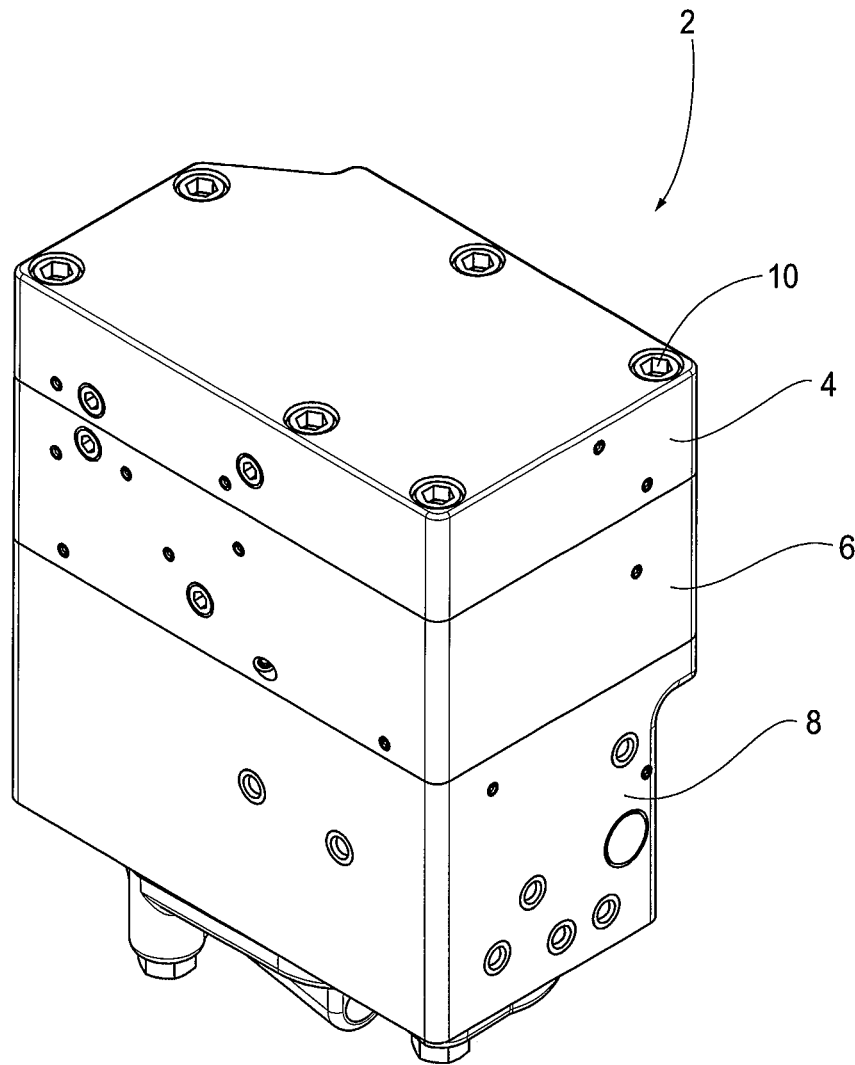
FIG. 1 is a front perspective view of a brake valve that includes a cut-off valve and hot wheel protection valve arrangement in accordance with one aspect of this disclosure.
Figure 2:
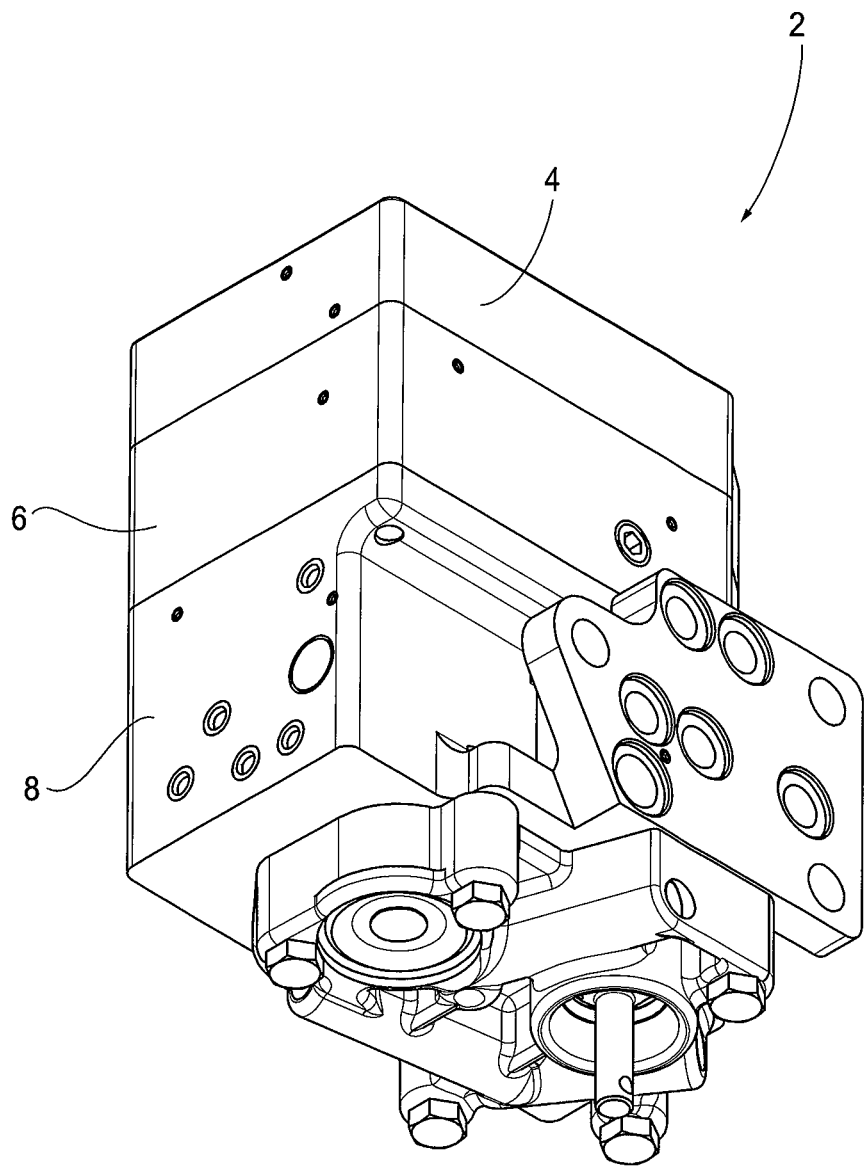
FIG. 2 is a rear perspective view of the brake valve of FIG. 1.
Figure 3:
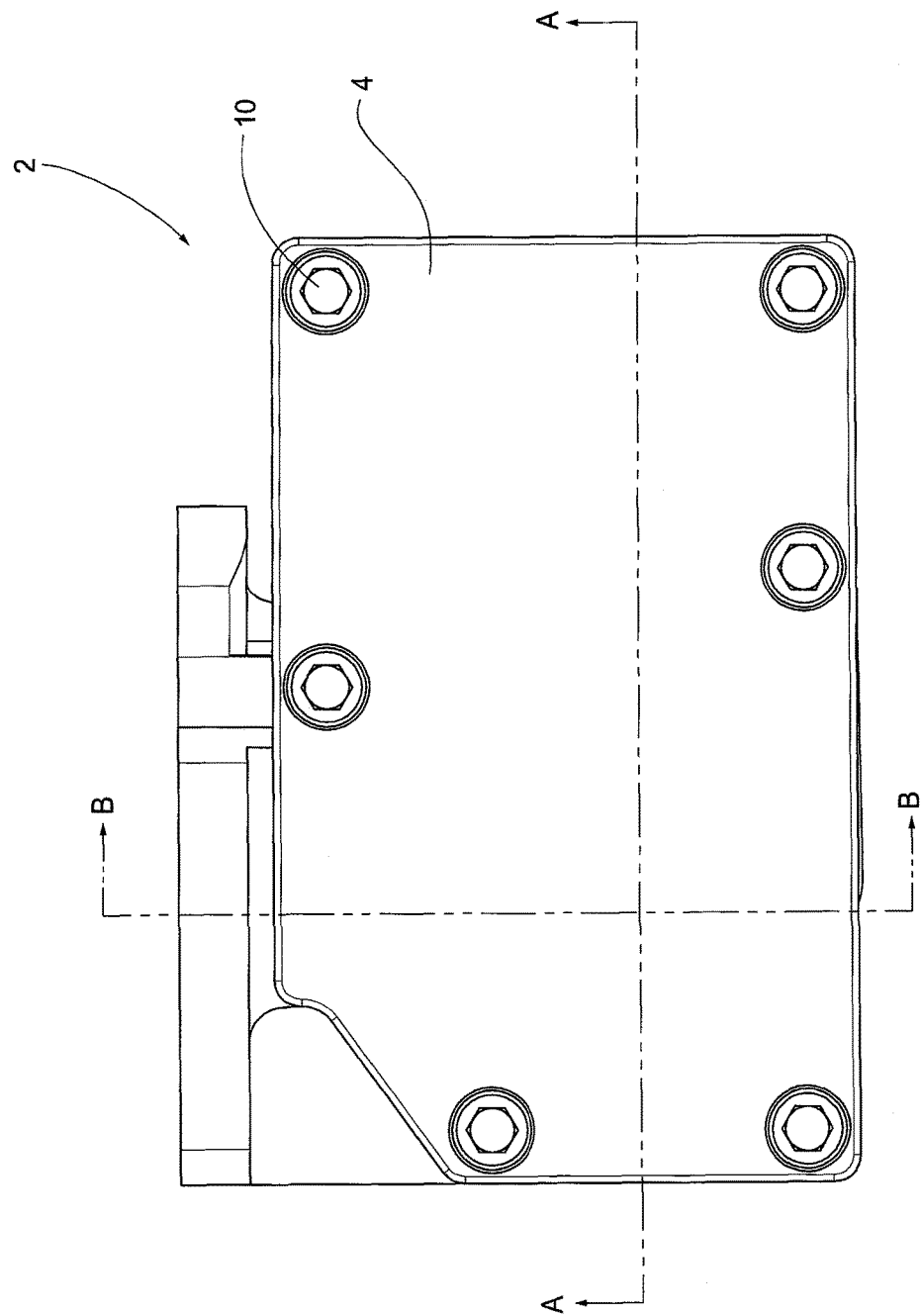
FIG. 3 is a top view of the brake valve of FIG. 1.

For purposes of the description hereinafter, the terms "upper", "lower", "right", "left", "vertical", "horizontal", "top", "bottom", "lateral", "longitudinal", and derivatives thereof, shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Referring to the drawings in which like reference characters refer to like parts throughout the several views thereof, the present disclosure is generally directed to a cut-off valve and hot wheel protection valve arrangement for use with a railway vehicle to vent excess pressurized fluid that may leak into the brake cylinder of the railway vehicle.

Figure 4:
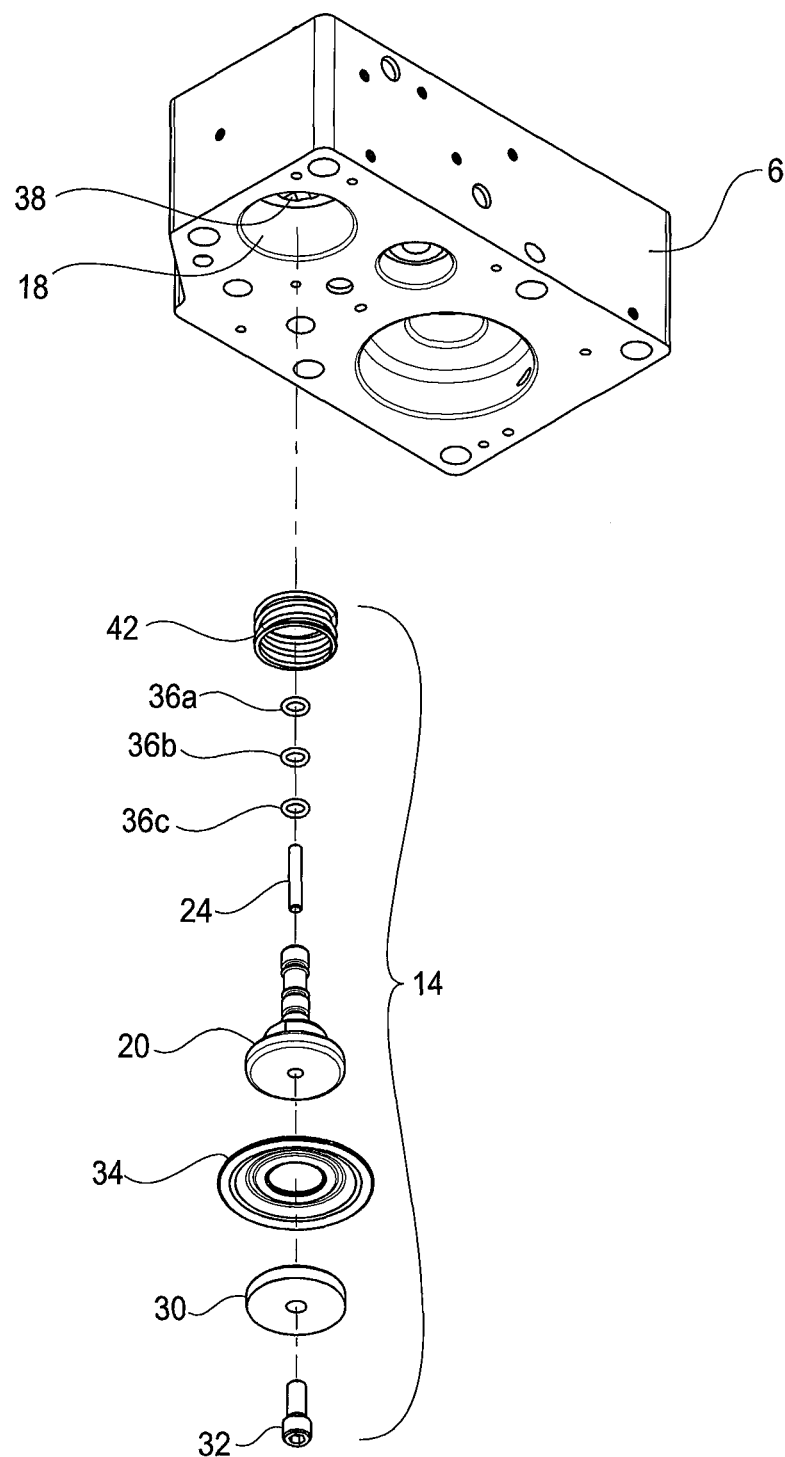
FIG. 4 is an exploded assembly drawing of a central main body of the brake valve of FIG. 1 that only depicts components of the hot wheel protection valve.
Figure 5A:
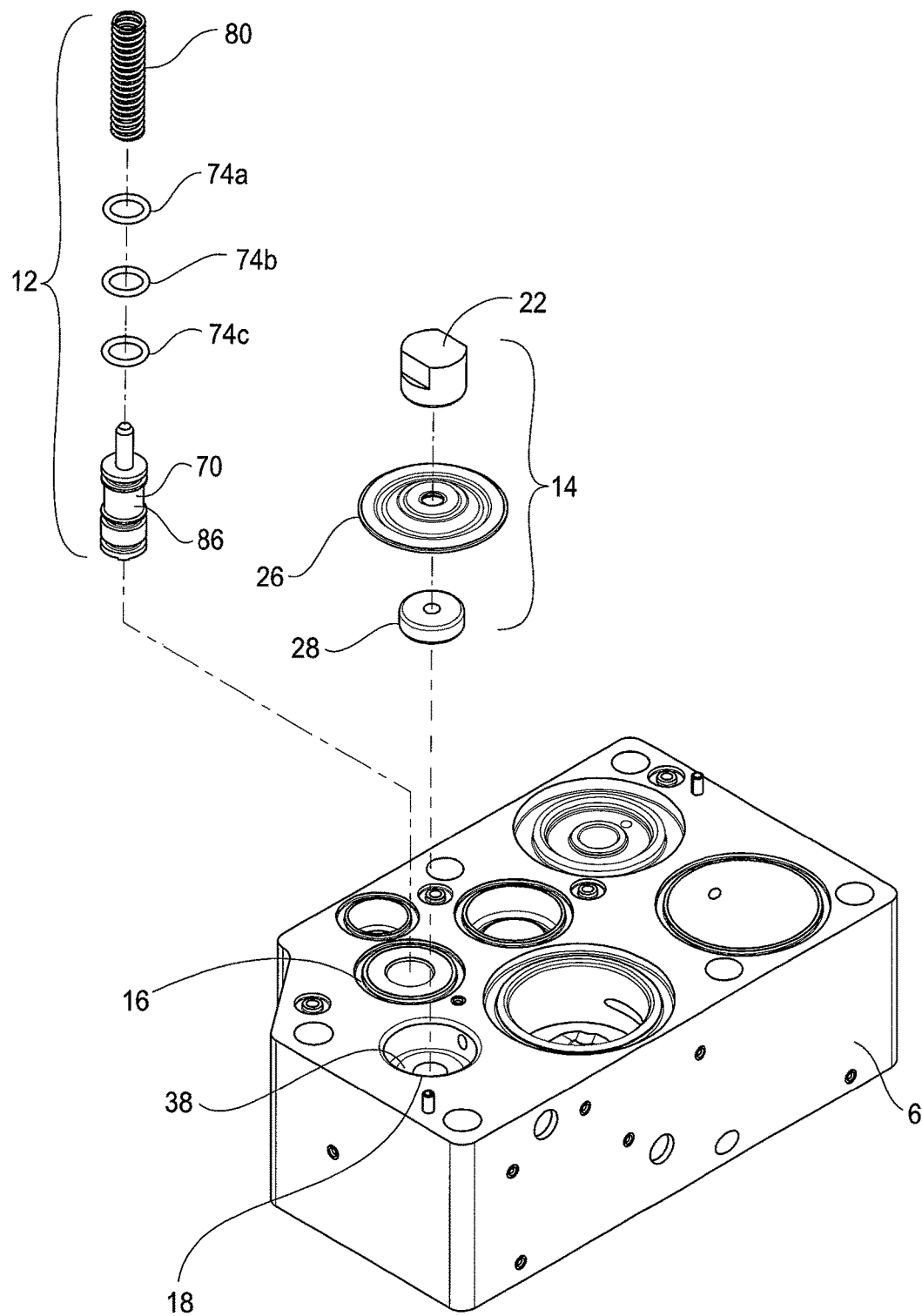
FIG. 5A is an exploded assembly drawing of a central main body of the brake valve of FIG. 1 that only depicts components of the cut-off valve and the hot wheel protection valve.
Figure 5B:
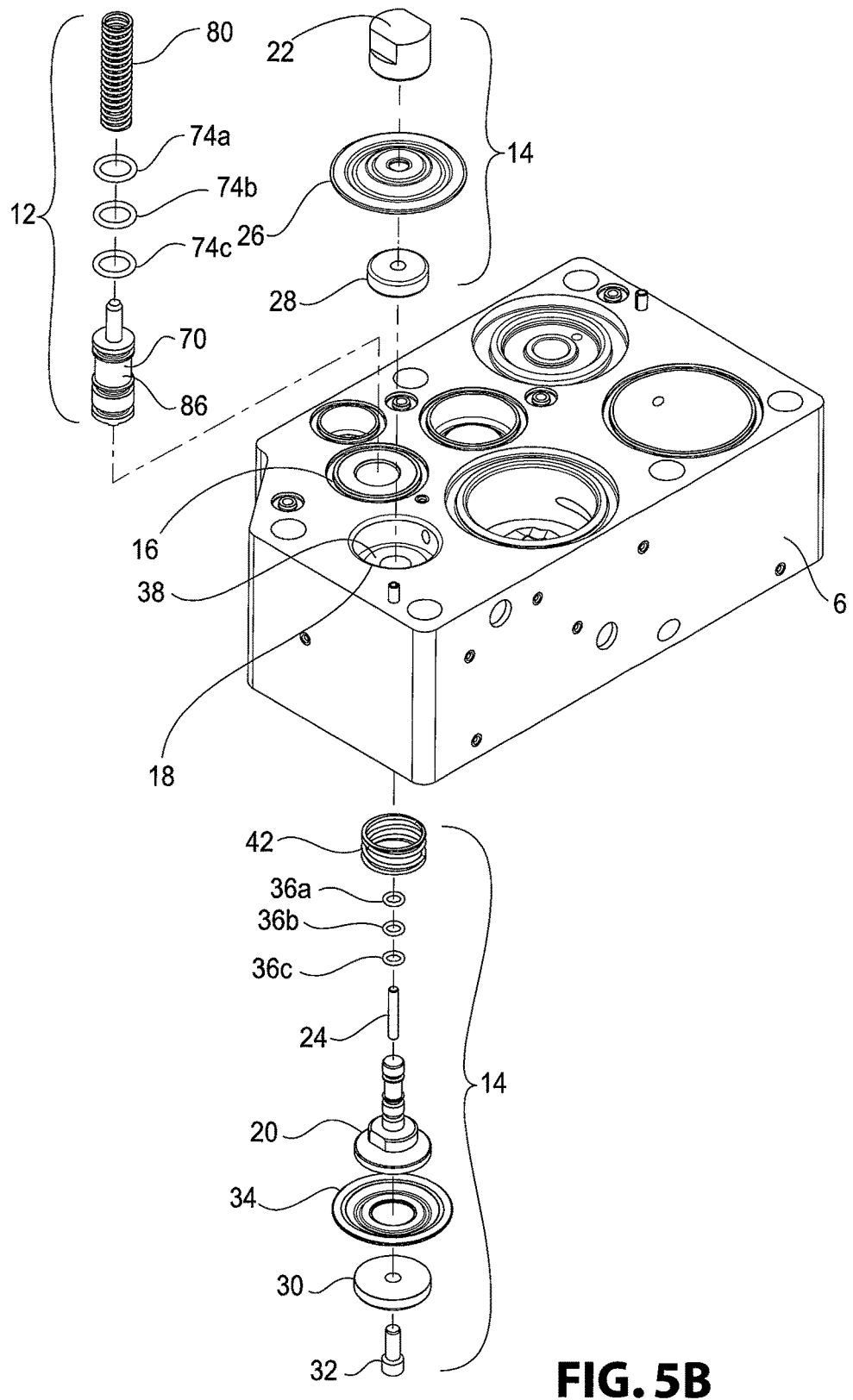
FIG. 5B is an exploded assembly drawing showing a central main body of the brake valve of FIG. 1 that depicts all of the components of the cut-off valve and the hot wheel protection valve.

Referring initially to FIGS. 1-5B, an aspect of a brake valve 2 for a railway vehicle is shown. The brake control valve 2, as described herein, is intended for use in a brake system of a railway car, as will be readily apparent to those skilled in the rail vehicle art. In particular, brake control valve 2 may be provided in a service portion of a railway brake arrangement. The brake control valve 2 may be adapted for use in railway vehicles used for passenger and/or cargo transit. However, this use is intended to be non-limiting and the brake control valve 2 has applications in railway cars generally. Brake control valve 2 in the depicted aspect includes an upper main body 4, a central main body 6, and a lower main body 8. In one aspect, upper main body 4, central main body 6, and lower main body 8 may be connected together using fasteners 10 to form brake control valve 2. In another aspect, upper main body 4, central main body 6, and lower main body 8 may be formed as a monolithic structure. Brake control valve 2 may include, among other components, a cut-off valve 12 and a hot wheel protection valve 14. It is to be understood that additional components may be included in brake control valve 2, including a brake cylinder maintaining valve, a manual release shuttle and check valve, and/or an automated release spool, which are not shown or described in this disclosure. As shown in FIGS. 4, 5A, and 5B, central main body 6 may define a cavity 16 to receive cut-off valve 12 and a cavity 18 to receive hot wheel protection valve 14. Cavity 16 may extend from an upper surface of central main body 6 to an intermediate position in central main body 6. Cavity 18 may extend from an upper surface of central main body 6 to a lower surface of central main body 6.

Figure 6:
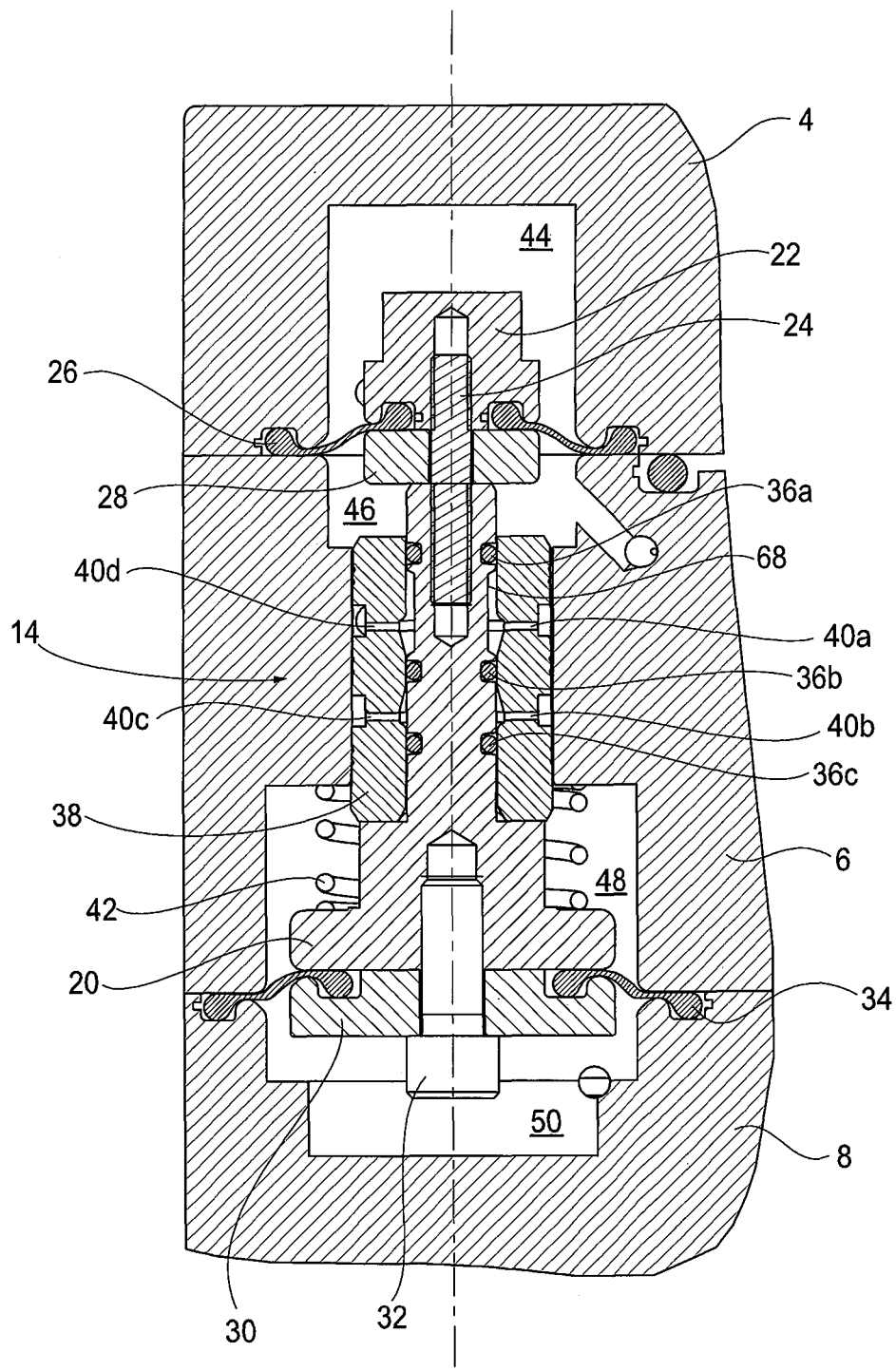
FIG. 6 is an isolated cross-sectional view of the brake valve along line A-A of FIG. 3 depicting the hot wheel protection valve.

Referring to FIGS. 4-6, an aspect of hot wheel protection valve 14 is shown. Hot wheel protection valve 14 may include several components used for exhausting pressurized fluid from a brake cylinder of a railway vehicle. Hot wheel protection valve 14, as described herein, is intended for use in a brake system of a railway car, as will be readily apparent to those skilled in the rail vehicle art. Hot wheel protection valve 14 is adapted for use in railway vehicles used for passenger and/or cargo transit. However, this use is intended to be non-limiting and hot wheel protection valve 14 has applications in railway cars generally.

Hot wheel protection valve 14 may include piston 20 connected to a feedback follower 22 using a rod 24, typically threaded. An upper portion of piston 20 and feedback follower 22 may each define a threaded cavity that is threadedly connected to a portion of threaded rod 24. A feedback diaphragm 26 and a spacer 28 may also be provided on threaded rod 24 and positioned between the upper portion of piston 20 and feedback follower 22. In one aspect, feedback diaphragm 26 may be a flexible member that is configured to flex or stretch upwardly or downwardly upon movement of piston 20 in an upward or downward direction within brake control valve 2. In one aspect, an outer circumferential surface of feedback diaphragm 26 may be positioned between upper main body 4 and central main body 6 of brake control valve 2 so that feedback diaphragm 26 is "sandwiched" therebetween, and an inner circumferential surface of feedback diaphragm 26 may be "sandwiched" between feedback follower 22 and spacer 28.

A bottom portion of piston 20 may be connected to a follower 30 via a fastener 32. Fastener 32 may be inserted through follower 30 and threaded into a cavity defined in the bottom portion of piston 20. Another diaphragm 34 may be positioned between the bottom portion of piston 20 and follower 30. In one aspect, diaphragm 34 may be a flexible member that is configured to flex or stretch upwardly or downwardly upon movement of piston 20 in an upward or downward direction within brake control valve 2. In one aspect, an outer circumferential surface of diaphragm 34 may be positioned between central main body 6 and lower main body 8 of brake control valve 2 so that diaphragm 34 is "sandwiched" therebetween, and an inner circumferential surface of diaphragm 34 may be "sandwiched" between piston 20 and follower 30.

In one aspect, piston 20 may have a T-shaped vertical cross-section. An upper portion of piston 20 may have a reduced diameter compared to a lower portion of piston 20. The upper portion of piston 20 may define a plurality of circumferential grooves in an outer surface of piston 20. The grooves may be provided at different longitudinal positions along the upper portion of piston 20. A plurality of O-rings 36a, 36b, 36c may be positioned within the grooves defined in piston 20. O-rings 36a, 36b, 36c are provided to prevent leakage of pressurized fluid from hot wheel protection valve 14. Although three grooves and three O-rings are shown in connection with piston 20, it is to be understood that more or less grooves and/or O-rings may be provided to create a tighter seal between piston 20 and a bushing 38 provided around the upper portion of piston 20.

Bushing 38 may be cylindrical in shape to fit around the upper portion of piston 20. Bushing 38 may be slidable in relation to piston 20. A plurality of bushing passageways 40a, 40b, 40c, 40d may be defined in bushing 38. Bushing passageways 40a, 40b, 40c, 40d may permit pressurized fluid to pass through bushing 38 and, thereby, out of hot wheel protection valve 14, as will be described in detail below. Although four bushing passageways 40a, 40b, 40c, 40d are shown in connection with bushing 38, it is to be understood that more or less bushing passageways may be provided to more efficiently allow pressurized fluid to pass through bushing 38. The bushing 38 may rest on a portion of piston 20. A biasing member 42 may also be positioned around piston 20. A lower end of biasing member 42 may rest on a portion of piston 20, and an upper end of biasing member 42 may rest against a portion of central main body 6. In one aspect, biasing member 42 may be a spring. However, it is to be understood that alternative biasing members may be used that provide a resilient member that may be compressed and expanded to provide a biasing force. Biasing member 42 may be configured to assert a biasing force against piston 20 and diaphragm 34 during operation of hot wheel protection valve 14. It is also contemplated that biasing member 42 may not be used with hot wheel protection valve 2. As shown in FIG. 5B, during assembly of the brake control valve 2 several components 22, 26, 28 of the hot wheel protection valve 14 may be inserted into the upper end of the cavity 18, while the remaining components 20, 24, 30, 32, 34, 36a-36c, 42 of the hot wheel protection valve 14 may be inserted into the bottom end of the cavity 18.

With reference to FIG. 6, a plurality of chambers may be established by hot wheel protection valve 14 within brake control valve 2. A first chamber 44 may be established above feedback diaphragm 26. A second chamber 46 may be established between flexible diaphragm 26 and bushing 38. A third chamber 48 may be established between the portion of central main body 6 on which biasing member 42 rests, and diaphragm 34. A fourth chamber 50 may be established below diaphragm 34. Chambers 44-50 are configured to receive pressurized fluid from different parts of brake control valve 2, which will be described below.

Figure 8:
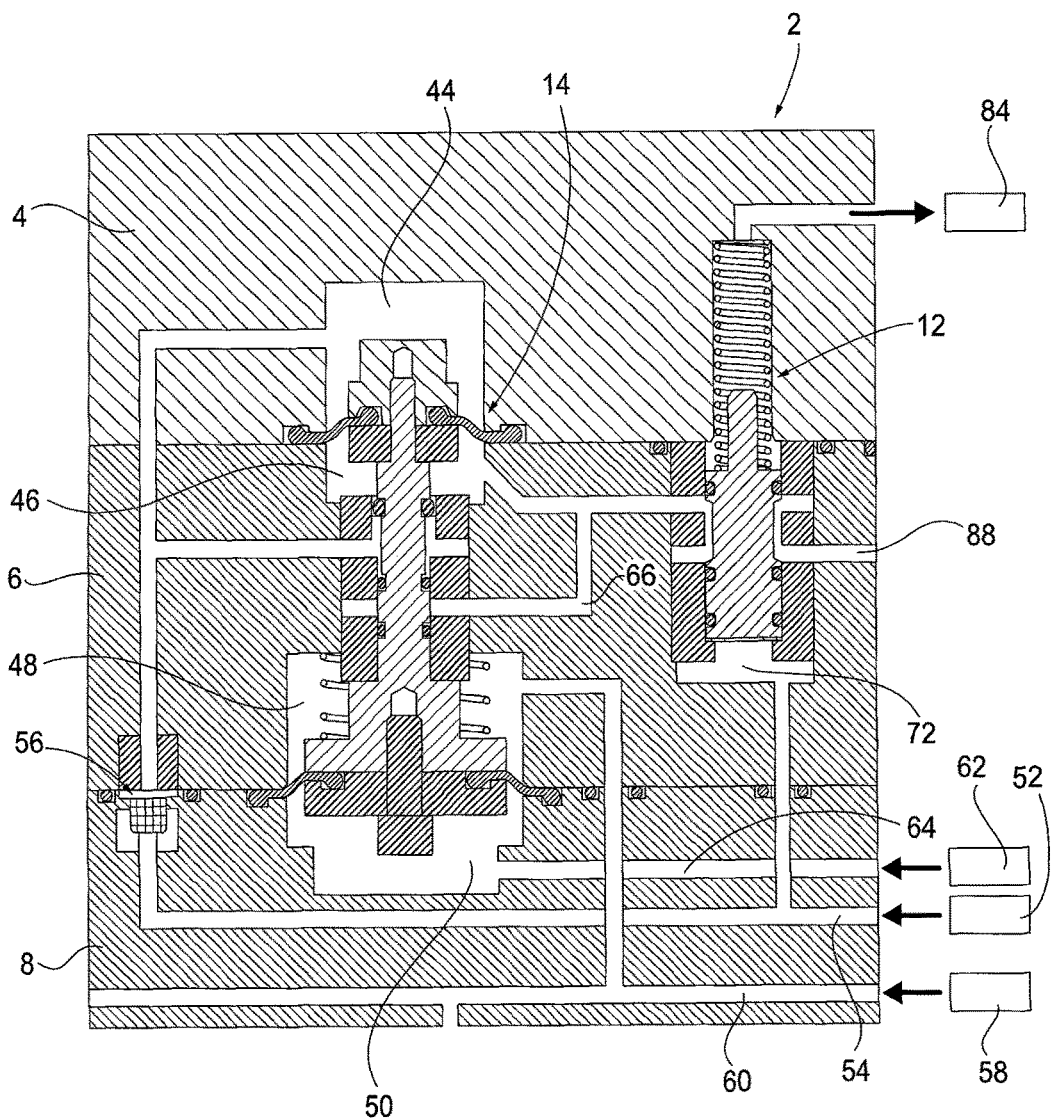
FIG. 8 is a schematic drawing of the cut-off valve and hot wheel protection valve arrangement provided in the brake valve of FIG. 1.

In one aspect, shown in FIG. 8, a brake cylinder 52 may be in fluid communication with first chamber 44 of hot wheel protection valve 2 via a brake cylinder line 54. Through brake cylinder line 54, brake cylinder 52 may supply pressurized fluid to first chamber 44. A choke 56 may also be provided in brake cylinder line 54 to regulate the flow of pressurized fluid through brake cylinder line 54. Choke 56 may be positioned between brake cylinder 52 and first chamber 44. Brake cylinder line 54 may also be in fluid communication with bushing 38 and, in particular, bushing passageways 40a, 40b, 40c, 40d. As will be described in greater detail below, pressurized fluid from brake cylinder 52 may be exhausted through bushing passageways 40a, 40b, 40c, 40d to reduce the volume of pressurized fluid in brake cylinder 52. A brake pipe 58 may be in fluid communication with third chamber 48 of hot wheel protection valve 14 via a brake pipe line 60. It is also contemplated that an auxiliary reservoir (not shown) may be in fluid communication with third chamber 48, instead of brake pipe 58. The auxiliary reservoir would supply pressurized fluid to third chamber 48 in a same manner as brake pipe 58. In particular, the auxiliary reservoir would be in fluid communication with third chamber 48 via an auxiliary reservoir line. An emergency reservoir 62 may be in fluid communication with fourth chamber 50 of hot wheel protection valve 14 via an emergency reservoir line 64. A hot wheel exhaust line 66 may be in fluid communication with bushing passageways 40a, 40b, 40c, 40d, cut-off valve 12, and second chamber 46. Details regarding cut-off valve 12 and its operation are provided below.

Operation of a hot wheel protection valve 14 to exhaust brake cylinder 52 pressure from a brake system of a railway vehicle is described below. As previously discussed, by using hot wheel protection valve 14, any excess pressurized fluid that leaks into the brake cylinder 52 of the railway vehicle may be exhausted from the brake system, thereby avoiding a hot wheel situation for the railway vehicle.

With reference to FIG. 8, during use of hot wheel protection valve 14, biasing member 42 may apply a predetermined downward force on piston 20. The predetermined downward force may be provided based on the stiffness and resiliency of biasing member 42. The downward force exerted by biasing member 42 on piston 20, in turn, provides a downward force on diaphragm 34. It is also contemplated that pressurized fluid in first chamber 44 from brake cylinder 52 may assert a downward force on feedback diaphragm 26 and thereby piston 20. Pressurized fluid in third chamber 48 from brake pipe 58 (or, alternatively, an auxiliary reservoir) may also provide a downward force on diaphragm 34 and thereby piston 20, which is connected to diaphragm 34. Pressurized fluid in fourth chamber 50 from emergency reservoir 62 may assert an upward force on diaphragm 34 and thereby piston 20. In this aspect, a pressure differential is developed between biasing member 42, brake pipe 58, and brake cylinder 52 on a first side of hot wheel protection valve 14, and emergency reservoir 62 on a second opposing side of hot wheel protection valve 14. Hot wheel protection valve 14 is positioned in a lap position when the opposing forces on the pressure differential are substantially equal. In this situation, bushing passageway 40b, which leads to hot wheel exhaust line 66, is closed off by an outer surface of piston 20.

During operation of the railway vehicle, when brake cylinder 52 pressure is provided at a predetermined level, the hot wheel protection valve 14 remains in the lap position. In one aspect, when brake cylinder 52 pressure is less than 42 psi, hot wheel protection valve 14 is positioned in the lap position and does not vent excess pressurized fluid from hot wheel protection valve 14. However, during operation of the railway vehicle, pressurized fluid may slowly leak into brake cylinder 52, thereby bringing brake cylinder 52 pressure to an excessive pressure level. To avoid a hot wheel condition, this excessive pressure should be vented from brake cylinder 52. As the pressure increases in brake cylinder 52, the downward force from the pressurized fluid supplied to first chamber 44 is increased and unbalances the pressure differential in hot wheel protection valve 14. Pressurized fluid in first chamber 44 pushes down on feedback diaphragm 26, which pushes piston 20 downwardly. As piston 20 is moved downwardly, bushing passageway 40b is opened and fluid communication is established between brake cylinder line 54 and hot wheel exhaust line 66. A groove 68 on piston 20 allows for fluid communication from brake cylinder line 54 to hot wheel exhaust line 66. Groove 68 allows for fluid communication from brake cylinder line 54, through bushing passageway 40d, through groove 68, through bushing passageway 40b, and through hot wheel exhaust line 66. This fluid communication allows pressurized fluid from brake cylinder line 54 to vent through bushing passageway 40b to exhaust through hot wheel exhaust line 66. As pressurized fluid is vented from brake cylinder 52, the downward pressure exerted on feedback diaphragm 26 and piston 20 by pressurized fluid in first chamber 44 is reduced accordingly. As the downward pressure exerted on piston 20 is reduced, the pressure differential is brought back to the lap position, wherein the downward pressure exerted by pressurized fluid in first chamber 44, third chamber 48, and biasing member 42 is substantially equal to the upward pressure applied by the pressurized fluid in fourth chamber 50. Hot wheel protection valve 14 may be configured to reach the lap position when brake cylinder 52 pressure ceases to increase and pressure on piston 20 is reduced. Hot wheel protection valve 14 may "meter" or continually vent to match the leakage into brake cylinder 52 in order to prevent an increase above a predetermined pressure level in brake cylinder 52.

While hot wheel protection valve 14 will ensure that any pressurized fluid that leaks into brake cylinder 52 will be vented from brake control valve 2 to maintain a desired brake cylinder 52 pressure level, it is also contemplated that there are situations during operation of the railway vehicle in which an operator intends to stop the railway vehicle and an excess pressure level in brake cylinder 52 is desired to apply a brake force to the railway vehicle. In this situation, the venting of brake cylinder 52 is no longer appropriate since any and all brake cylinder 52 pressure should be available to control or stop the railway vehicle. Cut-off valve 12 provides the ability to nullify the exhaust feature of hot wheel protection valve 14 to allow pressurized fluid to build up in brake cylinder 52. In one aspect, cut-off valve 12 prevents venting of hot wheel protection valve 14 when brake cylinder 52 pressure exceeds 42 psi. It is to be understood, however, that different brake cylinder 52 pressure levels which nullify the venting of hot wheel protection valve 14 are also contemplated.

Figure 7:
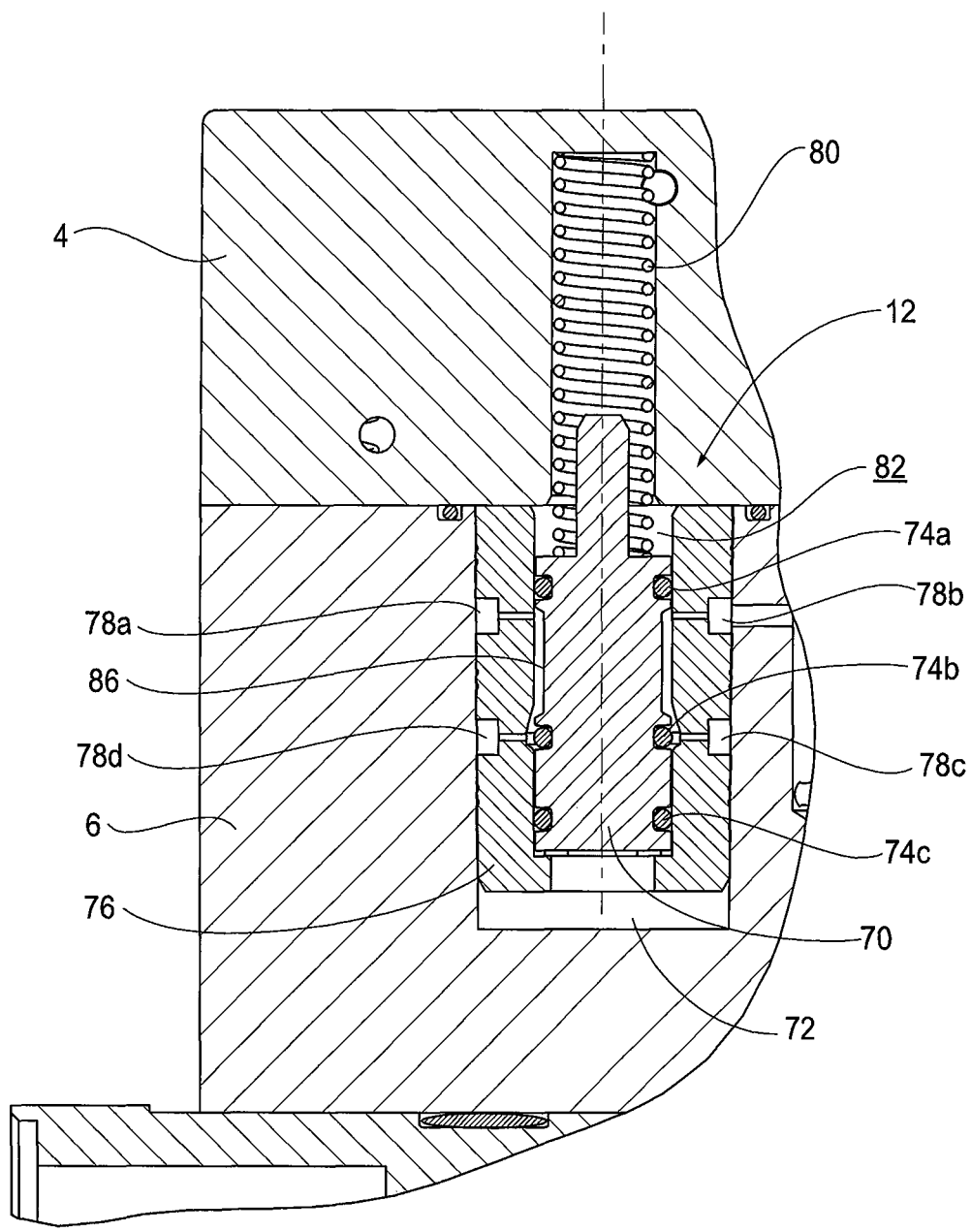
FIG. 7 is an isolated cross-sectional view of the brake valve along line B-B of FIG. 3 depicting the cut-off valve.

Referring to FIGS. 5A, 5B, and 7, cut-off valve 12 is shown. Cut-off valve 12 may be in fluid communication with hot wheel protection valve 14 via hot wheel exhaust line 66. Cut-off valve 12 may include a piston 70 positioned in a chamber 72 defined by central main body 6. A plurality of grooves may be defined in an outer surface of piston 70. An O-ring 74a, 74b, 74c may be positioned in each groove defined on piston 70. O-rings 74a, 74b, 74c are provided to prevent leakage of pressurized fluid from cut-off valve 12. Although three grooves and three O-rings are shown in connection with piston 70, it is to be understood that more or less grooves and/or O-rings may be provided to create a tighter seal between piston 70 and bushing 76 provided around the piston 70. Bushing 76 may be cylindrical in shape to fit around piston 70. Bushing 76 may be slidable in conjunction with piston 70. A plurality of bushing passageways 78a, 78b, 78c, 78d may be defined in bushing 76. Bushing passageways 78a, 78b, 78c, 78d may permit pressurized fluid to pass through bushing 76 and, thereby, out of hot wheel protection valve 14, through cut-off valve 12, and out of cut-off valve 12, as will be described in detail below. Although four bushing passageways 78a, 78b, 78c, 78d are shown in connection with bushing 76, it is to be understood that more or less bushing passageways may be provided to more efficiently allow pressurized fluid to pass through bushing 76. A biasing member 80 may be provided on an upper portion of piston 70. In one aspect, biasing member 80 may be a spring. However, it is to be understood that alternative biasing members may be used to provide a resilient member that may be compressed and expanded to provide a biasing force. Biasing member 80 may be configured to assert a biasing downward force against piston 70 during operation of cut-off valve 12. It is also contemplated that biasing member 80 may not be used with cut-off valve 12. Biasing member 80 may be positioned in a chamber 82 defined by upper main body 4. As shown in FIG. 5B, the components 70, 74a-74c, 80, 86 may be inserted into an upper end of the cavity 16 of the brake control valve 2.

As shown in FIG. 8, brake cylinder 52 may also be in fluid communication with chamber 72 cut-off valve 12 via brake cylinder line 54. Pressurized fluid supplied to chamber 72 from brake cylinder 52 asserts an upward force on piston 70. Chamber 82 may be fluidly connected to atmosphere 84. A pressure differential is established between the force exerted by biasing member 80 and atmospheric pressure on one side of piston 70, and the force exerted by the pressurized fluid in chamber 72 from brake cylinder 52. When these pressures are substantially equal, the piston 70 is positioned in a lap position.

In one aspect, when brake cylinder 52 is positioned in a release position, and brake cylinder 52 pressure is approximately zero psi, biasing member 80 exerts enough force on piston 70 to permit venting of hot wheel protection valve 14. In this situation, however, since there is no brake cylinder 52 pressure, venting of brake cylinder 52 through hot wheel protection valve 14 is not needed. When brake cylinder 52 is in an applied position, brake cylinder 52 pressure is greater than zero but less than a predetermined excess pressure level. In the applied situation, the force exerted by the pressurized fluid in chamber 72 from brake cylinder 52 is insufficient to overcome the force exerted by biasing member 80. Therefore, cut-off valve 12 remains open and permits venting of pressurized fluid from hot wheel protection valve 14. As pressurized fluid is leaked into brake cylinder 52, and hot wheel protection valve 14 is used to vent the excess pressurized fluid, the vented pressurized fluid is directed through hot wheel exhaust line 66 into cut-off valve 12. The vented pressurized fluid is directed through bushing passageway 78a, through a groove 86 defined in the outer surface of piston 70, through bushing passageway 78c, and through a cut-off valve exhaust line 88. The vented pressurized fluid is vented out of the cut-off valve 12 through cut-off valve exhaust line 88 and is vented to atmosphere or, alternatively, another chamber (i.e., a retainer exhaust cavity) of hot wheel protection control valve 2.

In another aspect, when brake cylinder 52 is in an applied position and excess pressurized fluid is supplied to brake cylinder 52, cut-off valve 12 may be activated to prevent the excess pressurized fluid from being vented from hot wheel protection valve 14. In one aspect, when the brake cylinder 52 pressure exceeds 42 psi, the cut-off valve 12 is activated. When the brake cylinder 52 is supplied with this excess pressurized fluid, the pressurized fluid is directed to chamber 72 of cut-off valve 12. The pressurized fluid in chamber 72 exerts an upward force on piston 70 that is greater than and overcomes the downward force exerted by the biasing member 80 on piston 70. In this situation, the piston 70 is moved upwards in cut-off valve 12, which closes bushing passageways 78a, 78c to prevent pressurized fluid vented from hot wheel protection valve 14 from being vented through cut-off valve exhaust line 88. Since bushing passageways 78a, 78c are closed to prevent venting through cut-off valve 12, any pressurized fluid vented from hot wheel protection valve 14 through hot wheel exhaust line 66 is directed to second chamber 46 of hot wheel protection valve 14 via hot wheel exhaust line 66, as shown in FIG. 8. Since no pressurized fluid is permitted to exhaust from hot wheel protection valve 14, substantially all of the pressurized fluid supplied to brake cylinder 52 can be used to apply the brakes on the railway vehicle. Choke 56 also assists in preventing the pressurized fluid from being vented through hot wheel protection valve 14 when an operator wants full brake cylinder 52 pressure to apply the brakes on the railway vehicle. Choke 56 regulates the flow of pressurized fluid into hot wheel protection valve 14 and ensures that a considerable amount of the pressurized fluid from brake cylinder 52 is directed to chamber 72 of cut-off valve 12 instead of hot wheel protection valve 14 to ensure that cut-off valve 12 nullifies the venting feature of hot wheel protection valve 14.

While various aspects of cut-off valve 12 and hot wheel protection valve 14 were provided in the foregoing description, those skilled in the art may make modifications and alterations to these aspects without departing from the scope and spirit of the disclosure. For example, it is to be understood that this disclosure contemplates that, to the extent possible, one or more features of any aspect can be combined with one or more features of any other aspect. Accordingly, the foregoing description is intended to be illustrative rather than restrictive. The disclosure described hereinabove is defined by the appended claims and all changes to the invention that fall within the meaning and the range of equivalency of the claims are to be embraced by their scope.

The invention claimed is:

1. A hot wheel protection valve arrangement, comprising:
   a hot wheel protection valve, comprising:
      a body defining a passageway;
      a piston slidably positioned within the passageway;
      a bushing positioned on the piston and within the passageway;
      a first diaphragm provided on a first end of the piston, the first diaphragm defining a first chamber in the passageway;
      a second diaphragm provided on a second end of the piston, wherein a second chamber is defined between the first diaphragm and the second diaphragm, the second diaphragm defining an additional chamber in the passageway; and
      an exhaust port defined in the body and in fluid communication with the second chamber;
   a brake cylinder line that establishes fluid communication between a brake cylinder, the first chamber, and the second chamber; and
   an emergency reservoir line that establishes fluid communication between an emergency reservoir and the additional chamber,
   wherein pressurized fluid is vented from the brake cylinder via the exhaust port upon a brake cylinder pressure exceeding a predetermined force exerted by an emergency reservoir pressure.

2. The hot wheel protection valve arrangement as claimed in claim 1, wherein the bushing defines at least one bushing passageway in fluid communication with the brake cylinder line and the exhaust port.

3. The hot wheel protection valve arrangement as claimed in claim 1, further comprising a choke provided in the brake cylinder line between the brake cylinder and an inlet port defined in the hot wheel protection valve configured to receive pressurized fluid from the brake cylinder.

4. The hot wheel protection valve arrangement as claimed in claim 1,
   wherein a third chamber is defined between the first diaphragm and the second diaphragm,
   wherein a brake pipe line establishes fluid communication between a brake pipe and the third chamber, or an auxiliary reservoir line establishes fluid communication between an auxiliary reservoir and the third chamber,
   wherein the pressurized fluid is vented from the brake cylinder via the exhaust port upon a brake cylinder pressure exceeding a predetermined force exerted against a differential of the emergence reservoir pressure and a brake pipe pressure or an auxiliary reservoir pressure, and
   wherein the additional chamber is a fourth chamber.

5. The hot wheel protection valve arrangement as claimed in claim 4,
   further comprising a biasing member provided in the third chamber, and
   wherein the biasing member creates a biasing force against the second diaphragm.

6. The hot wheel protection valve arrangement as claimed in claim 1,
   wherein a groove is defined on an outer surface of the piston, and
   wherein, as the piston slides within the passageway to a predetermined position, pressurized fluid from the brake cylinder line is permitted to flow through the bushing, around the groove defined on the piston, through the bushing again, and through the exhaust port.

7. The hot wheel protection valve arrangement as claimed in claim 1,
   wherein an outer circumferential surface of the first diaphragm is held within the body of the hot wheel protection valve and an inner circumferential surface of the first diaphragm is held on the first end of the piston between a feedback follower and a spacer, and
   wherein an outer circumferential surface of the second diaphragm is held within the body of the hot wheel protection valve and an inner circumferential surface of the second diaphragm is held on the second end of the piston between the second end of the piston and a follower.

8. A hot wheel protection valve arrangement, comprising:
   a cut-off valve in fluid communication with an exhaust port of a hot wheel protection valve and a brake cylinder line, the cut-off valve comprising:
      a piston positioned within a passageway;
      a bushing provided around the piston and within the passageway; and
      a biasing member provided on an end of the piston;
   wherein the brake cylinder line establishes fluid communication between the cut-off valve and a brake cylinder;
   wherein the cut-off valve prevents pressurized fluid from being exhausted from the brake cylinder upon a brake cylinder pressure exceeding a predetermined force exerted by the cut-off valve; and
   wherein the biasing member creates the predetermined force against the piston to keep the cut-off valve in an open position.

9. The hot wheel protection valve arrangement as claimed in claim 8, wherein the passageway of the cut-off valve is in fluid communication with the exhaust port of the hot wheel protection valve, the brake cylinder line, and a line to atmosphere.

10. The hot wheel protection valve arrangement as claimed in claim 8,
   wherein a groove is defined on an outer surface of the piston; and
   wherein, as the piston slides within the passageway to a predetermined position, pressurized fluid from the exhaust port of the hot wheel protection valve is permitted to flow through the bushing, around the groove defined on the piston, through the bushing again, and through an exhaust port on the cut-off valve.

11. The hot wheel protection valve arrangement as claimed in claim 8,
wherein a plurality of grooves are defined on an outer surface of the piston; and
wherein an O-ring is provided in each groove of the plurality of grooves.

12. A hot wheel protection valve arrangement, comprising:
a hot wheel protection valve, comprising:
a body defining a passageway;
a piston slidably positioned within the passageway;
a bushing positioned on the piston and within the passageway;
a first diaphragm provided on a first end of the piston, the first diaphragm defining a first chamber in the passageway;
a second diaphragm provided on a second end of the piston, wherein a second chamber is defined between the first diaphragm and the second diaphragm, the second diaphragm defining an additional chamber in the passageway; and
an exhaust port defined in the body and in fluid communication with the second chamber;
a cut-off valve in fluid communication with the exhaust port of the hot wheel protection valve, the cut-off valve comprising:
a piston positioned within a passageway;
a bushing provided around the piston and within the passageway; and
a biasing member provided on an end of the piston;
a brake cylinder line that establishes fluid communication with the first chamber, the second chamber, and the passageway of the cut-off valve; and
an emergency reservoir line that establishes fluid communication between an emergency reservoir and the additional chamber,
wherein pressurized fluid is vented from the brake cylinder via the exhaust port upon a brake cylinder pressure exceeding a force exerted by an emergency reservoir pressure.

13. The hot wheel protection valve arrangement as claimed in claim 12, wherein the cut-off valve prevents pressurized fluid from being exhausted from the brake cylinder upon a brake cylinder pressure exceeding a predetermined force exerted by the cut-off valve.

14. The hot wheel protection valve arrangement as claimed in claim 13, wherein the biasing member creates the predetermined force against the piston of the cut-off valve to keep the cut-off valve in an open position.

15. The hot wheel protection valve arrangement as claimed in claim 12, wherein the bushing of the hot wheel protection valve defines at least one bushing passageway in fluid communication with the exhaust port of the hot wheel protection valve, the passageway of the cut-off valve, and an exhaust port defined by the cut-off valve.

16. The hot wheel protection valve arrangement as claimed in claim 12, further comprising a choke provided in the brake cylinder line between the brake cylinder and an inlet port defined in the hot wheel protection valve configured to receive pressurized fluid from the brake cylinder.

17. The hot wheel protection valve arrangement as claimed in claim 12, wherein a third chamber is defined between the first diaphragm of the hot wheel protection valve and the second diaphragm of the hot wheel protection valve, and
wherein a brake pipe line establishes fluid communication between a brake pipe and the third chamber, or an auxiliary reservoir line establishes fluid communication between an auxiliary reservoir and the third chamber,
wherein the pressurized fluid is vented from the brake cylinder via the exhaust port upon a brake cylinder pressure exceeding a predetermined force exerted against a differential of the emergence reservoir pressure and a brake pipe pressure or an auxiliary reservoir pressure, and
wherein the additional chamber is a fourth chamber.

18. The hot wheel protection valve arrangement as claimed in claim 17, further comprising a biasing member provided in the third chamber,
wherein the biasing member creates a biasing force against the second diaphragm.

19. The hot wheel protection valve arrangement as claimed in claim 12,
wherein a groove is defined on an outer surface of the piston of the hot wheel protection valve, and
wherein, as the piston slides within the passageway to a predetermined position, pressurized fluid from the brake cylinder is permitted to flow through the bushing of the hot wheel protection valve, around the groove defined on the piston of the hot wheel protection valve, through the bushing of the hot wheel protection valve again, and through the exhaust port of the hot wheel protection valve.

20. The hot wheel protection valve arrangement as claimed in claim 12,
wherein an outer circumferential surface of the first diaphragm is held within the body of the hot wheel protection valve and an inner circumferential surface of the first diaphragm is held on the first end of the piston of the hot wheel protection valve between a feedback follower and a spacer, and
wherein an outer circumferential surface of the second diaphragm is held within the body of the hot wheel protection valve and an inner circumferential surface of the second diaphragm is held on the second end of the piston of the hot wheel protection valve between the second end of the piston and a follower.

* * * * *